T. LEAVITT.

Printing-Press.

No. 4,966 Reissued July 9. 1872.

WITNESSES.

Chas. J. Burns
J. P. McElroy

INVENTOR.

Thomas Leavitt
per
Brown Brothers
Attorneys.

A.M. PHOTO-LITHOGRAPHIC CO. N.Y. (OSBORNE'S PROCESS.)

UNITED STATES PATENT OFFICE.

THOMAS LEAVITT, OF EVERETT, MASSACHUSETTS, ASSIGNOR OF ONE-HALF INTEREST TO JOSEPH WATSON AND DAVID WATSON.

IMPROVEMENT IN PRINTING-PRESSES.

Specification forming part of Letters Patent No. 117,088, dated July 18, 1871; reissue No. 4,966, dated July 9, 1872.

*To all persons to whom these presents shall come:*

Be it known that I, THOMAS LEAVITT, of Everett, in the county of Middlesex and State of Massachusetts, have invented certain new and useful Improvements in Printing-Presses; and that the following is a full and exact description of the same, reference being had to the accompanying plate of drawing.

The present invention relates to that class of printing-presses having a platen and bed, with the one or both arranged to be swung toward and away from each other; and the invention consists in the combination with a platen adapted to be moved through a connecting rod or rods susceptible of adjustment in length, substantially as stated in the first part of this invention, or in any other suitable manner of constructing said platen or any part attached thereto, to swivel or turn in a plane across its width, so as to prevent straining or binding of the joint between platen and connection rod or rods, as such rods are adjusted to increase or decrease the length of movement of the platen to and from the bed. The invention consists, in addition to the above, of other improvements in details, which will be hereinafter particularly described.

Figure 1:
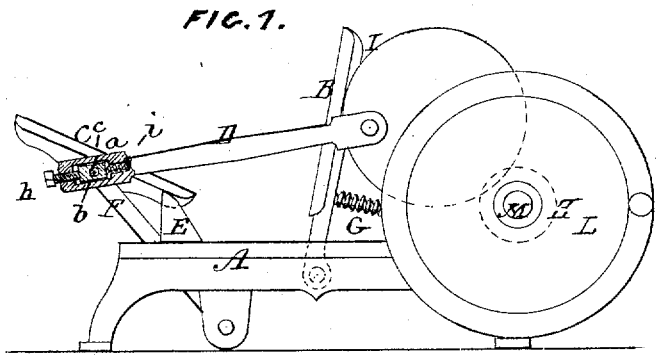
Figure 2:
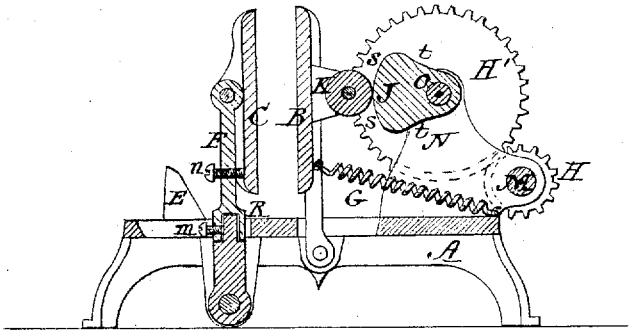
Figure 3:
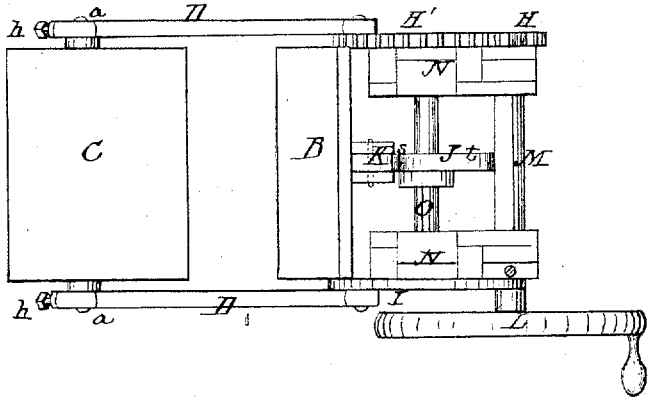

In the accompanying plate of drawing, my improvements in printing-presses are illustrated, Figure 1 being a side elevation of a printing-press embracing the same; Fig. 2, a vertical section, and Fig. 3 a plan view, of the same.

A in the drawing represents a frame suitably constructed to receive and carry the various stationary and moving parts of the press; B, the bed, and C the platen, both of which are arranged upon the frame A to swing in a vertical plane toward and away from each other, turning upon suitable centers in the lower part of the frame A, as shown; L, a balance-wheel secured to a horizontal driving-shaft, M, arranged to turn in suitable bearings of uprights N to the frame A; H, a pinion-wheel secured to one end of driving-shaft M, meshing into a gear-wheel, H′, secured to a horizontal shaft, O, arranged to turn in uprights N; J, a cam affixed to shaft O at or near its center and arranged to act against the friction-wheel K on the rear face of bed B; a spiral spring, G, secured to the bed B; and frame A holding the bed to the cam P. The platen C, by its rear side, is hung to swing in the upper end of an arm, F, that at its lower end is also arranged to swing upon the lower portion of frame A; D, rods hung at one end to the platen C, one on each side, and at their other ends connected one to crank-wheel I and the other to a wrist or gear wheel, H′, both wheels being attached to the shaft O. These rods D, by the turning of the shaft O, swing the platen toward and away from the bed. The rods D, at their ends hung to the platen C, are constructed of a strap form, *a*, having a sliding bearing-block, *b*, for the trunnion-pins *c* on each edge to the platen; *h*, adjusting-screws; and *i* spiral springs, arranged, as shown in Fig. 1, within the straps *a*, to act from the turning of the adjusting-screws, the one against the other, on the bearing-blocks *b*, holding them in the position to which they may be adjusted by turning the adjusting-screws *h*. The arm F, through which the platen C is hung to the frame A, is made in two transverse parts, that are constructed the one with a socket and the other with a tenon, as shown at R, Fig. 2, to turn or swivel horizontally the one upon the other; *m*, a set-screw for holding the two parts of arm F from becoming detached; E, projections located on frame A in suitable positions to tip the platen C into the position shown in Fig. 1, as such platen moves back or away from the bed; *n*, an adjusting-screw on arm F, serving as a stop to the swing of the platen into its vertical position, as shown in Fig. 2.

The bed B, by the cam J acting thereon through the friction-wheel K, is swung toward the platen C, bringing it into the vertical position shown in Fig. 2, where, by the travel then of the periphery *s* of the cam, (which periphery has a center in common with the axis of the shaft O carrying the cam,) the bed remains stationary and firm, so as to allow time for its "form" to receive first ink, and then the impression by platen, after which the bed is swung back by the tension of spiral spring G, the portions *t* of the periphery of the cam allowing the same, in whatever direction the driving-shaft is turned. The platen C, while the bed is operated as just above described, is swung toward and away from the bed, by and through the rods D connected therewith and with the wheels I and H′ of the same shaft O, which carries the cam J, operating the bed, and, in addition to such movement with regard to the bed, it is tipped in the backward movement of the platen into the position shown more particularly in Fig. 1, the forward movement of the platen bringing it to the upright position shown in Fig. 2. The movement of the platen toward the bed is partly simultaneous with the movement of the bed toward the platen, and vice versa, the platen coming against the bed after the bed has become stationary and the form been inked.

By a construction of the several parts of the press relatively one to another, substantially as described, the following results are obtained: First, the construction of the connecting-rods with adjustable sliding bearing-boxes for the platen enables the connecting-rods, as it were, to be shortened or lengthened at pleasure—that is, it enables the distance which the platen is to travel to be increased or decreased, producing, consequently, a lesser or greater degree of pressure by the platen on the bed when brought against it, the advantage of which in printing is obvious; second, that the swivel-joint of the platen prevents straining or binding of the joint between platen and connecting-rods in the adjustment of the rods D for the purpose before stated; third, that the bed and platen operate independently of each other, although by one and the same shaft; fourth, that the tilting of the platen throws it into a better position to receive the sheet to be printed; fifth, that, while the bed is a movable one, the form of cam and spring secures it in a fixed position when the form is receiving ink and an impression from the platen.

Having thus described my invention, I shall state my claim, as follows:

1. The combination, with adjustable connecting-rods D, of the swivel-joint R to the platen C, substantially as described, for the purpose specified.

2. The combination of the cam J with the connecting-rods D, substantially as and for the purpose set forth.

The above specification of my improvements in printing-presses signed by me this 27th day of November, 1871.

THOMAS LEAVITT.

Witnesses:
ALBERT W. BURNS,
J. P. MCELROY.